United States Patent [19]

Husted

[11] Patent Number: 4,840,776

[45] Date of Patent: Jun. 20, 1989

[54] METHOD FOR REMOVING SODIUM AND AMMONIA FROM COBALT

[75] Inventor: Eric F. Husted, Ulster, Pa.

[73] Assignee: GTE Products Corporation, Stamford, Conn.

[21] Appl. No.: 107,078

[22] Filed: Oct. 13, 1987

[51] Int. Cl.$^4$ .................. C01G 51/00; C22B 23/00
[52] U.S. Cl. .................. 423/150; 423/139; 423/140; 423/592; 75/0.5 AA; 75/0.5 BA; 75/119; 75/101 R; 75/108; 75/DIG. 2; 75/DIG. 3
[58] Field of Search .......... 423/139, 140, 150, 592; 75/0.5 AA, 0.5 BA, 119, DIG. 3, DIG. 2, 108, 101 R

[56] References Cited

U.S. PATENT DOCUMENTS

| | | | |
|---|---|---|---|
| 2,400,098 | 5/1946 | Brogdon | 75/101 R |
| 3,130,043 | 4/1964 | Lichty | 75/101 R |
| 3,880,651 | 4/1975 | Queneau et al. | 75/101 R |
| 3,994,720 | 11/1976 | Dubeck | 75/101 R |
| 4,034,059 | 7/1977 | Clark et al. | 423/144 |
| 4,093,450 | 6/1978 | Doyle et al. | 75/0.5 BA |
| 4,151,258 | 4/1979 | Crnojevich et al. | 423/150 |
| 4,175,014 | 11/1985 | Crnojevich et al. | 75/119 |
| 4,184,868 | 1/1980 | Ritsko et al. | 423/143 |
| 4,214,894 | 7/1980 | Ritsko et al. | 75/0.5 AA |
| 4,214,895 | 7/1980 | Gingerich et al. | 423/143 |
| 4,214,896 | 7/1980 | Cheresnowsky | 423/143 |
| 4,218,240 | 8/1980 | Gingerich et al. | 423/143 |
| 4,233,063 | 11/1980 | Ritsko et al. | 423/143 |
| 4,244,938 | 1/1981 | Alkaitis | 423/592 |
| 4,278,463 | 7/1981 | Vanderpool et al. | 423/143 |
| 4,329,169 | 5/1982 | Gingerich et al. | 423/144 |
| 4,348,224 | 9/1982 | Gingerich et al. | 75/119 |
| 4,381,937 | 5/1983 | Gingerich et al. | 75/119 |
| 4,395,278 | 7/1983 | Vanderpool et al. | 75/0.5 AA |
| 4,409,019 | 10/1983 | Vanderpool et al. | 75/119 |
| 4,452,633 | 6/1984 | Miller et al. | 75/119 |
| 4,469,505 | 9/1984 | Cheresnowsky et al. | 75/119 |
| 4,545,814 | 10/1985 | Chou et al. | 75/0.5 A |

Primary Examiner—Robert L. Stoll
Assistant Examiner—Paige C. Harvey
Attorney, Agent, or Firm—Donald R. Castle; L. Rita Quatrini

[57] ABSTRACT

A method is disclosed for purifying cobalt of sodium and ammonia which involves heating a solution of hexammine cobalt (III) chloride at a temperature of at least about 80° C., adding sodium hydroxide to the solution at a rate of addition not exceeding about 0.22 moles of sodium hydroxide per mole of cobalt per minute with the total amount of sodium hydroxide not exceeding about 1.4 times the stoichiometric amount required to form cobaltic hydroxide, separating the resulting cobaltic hydroxide precipitate from the resulting liquor, washing the precipitate with hot deionized water to remove sodium so that the level of sodium in the cobaltic hydroxide is equal to or less than about 60 weight parts per million on a cobalt basis, and firing the resulting washed precipitate at a temperature of from about 180° C. to about 850° C. to remove essentially all of the water and ammonia therefrom.

2 Claims, No Drawings

METHOD FOR REMOVING SODIUM AND AMMONIA FROM COBALT

This invention relates to a method for removing sodium and ammonia impurities from cobalt by a method of controlling the precipitation of cobaltic hydroxide from a solution of hexammine cobalt (III) chloride to produce a more washable crystal of cobaltic hydroxide, washing this cobaltic hydroxide, and firing the cobaltic hydroxide.

BACKGROUND OF THE INVENTION

Cobalt containing material may be treated hydrometallurgically to produce a high purity cobaltic hydroxide. This hydroxide can be hydrogen reduced to a high purity extra fine metal powder for use in cemented carbide manufacture. Among the impurities present in the cobalt hydroxide are:

Sodium: (Na—typically 100-200 pppm on a metal basis) and Ammonia: ($NH_3$—typically 3,000-8,000 ppm on a metal basis).

While these impurities are not deleterious in the manufacture of cemented carbides, they are unacceptable when the cobaltic hydroxide is used directly in non-metallurgical applications.

Some reductions of the Na and $NH_3$ values can be obtained by reslurrying the cobaltic hydroxide in deionized water and then separating the cobaltic hydroxide from the wash solution by filtration. It is difficult to achieve levels of Na below 70 ppm (metal basis) and $NH_3$ below about 3,000 ppm (metal basis).

The following is art related to the processing of cobalt.

U.S. Pat. No. 4,184,868 relates to a method for producing extra fine cobalt metal powder by digesting cobalt pentammine choride in ammonium hydroxide to obtain a black precipitate which contains cobalt and which is thereafter reduced to metal powder. U.S. Pat. Nos. 4,214,894, 4,233,063, and 4,278,463 relate to improvements in U.S. Pat. No. 4,184,868 in which the ammonia solutions are processed to recover any cobalt therein. U.S. Pat. Nos. 4,395,278 and 4,469,505 relate to improvements in U.S. Pat. No. 4,184,868 in which fine cobalt metal powder is produced having reduced tailings.

U.S. Pat. No. 4,214,895 relates to a process for producing cobalt metal powder which involves treating an aqueous solution of a soluble cobaltic ammine halide with a sufficient amount of a soluble metallic hydroxide to form a cobalt containing precipitate which is thereafter reduced to metallic cobalt.

U.S. Pat. No. 4,218,240 relates to a method for producing cobalt metal powder by forming a solution of a cobalt hexammine compound and treating the solution with a metallic hydroxide to form a precipitate which is reduced to cobalt metal powder. U.S. Pat. Nos. 4,348,224 and 4,381,937 relate to improvements in the process described in U.S. Pat. No. 4,218,240 which involve removal of copper and silver from the cobalt. U.S. Pat. No. 4,452,633 relates to an improvement in the processes described in U.S. Pat. Nos. 4,218,240 and 4,348,224 in which the silver is recovered.

U.S. Pat. No. 4,093,450 to Doyle et al describes a process for producing fine particle size cobalt metal powder by the hydrogen reduction of cobalt oxide obtained from a cobalt pentammine carbonate solution. The precipitate is formed by heating the solution to drive off ammonia and carbon dioxide to form a precipitate of cobalt oxide.

U.S. Pat. No. 4,329,169 relates to a process for producing fine cobalt metal powder absent tailings by heating an aqueous solution of soluble cobalt ammine halide to decompose the halide and form a cobalt containing precipitate which is reduced to the cobalt metal powder.

U.S. Pat. No. 4,409,019 relates to a process for producing fine cobalt metal powder from pieces of relatively pure cobalt by dissolving the cobalt pieces in an aqueous solution of hydrogen iodide and iodine and forming a cobalt containing solid which is subsequently reduced to a fine cobalt metal powder.

SUMMARY OF THE INVENTION

In accordance with one aspect of this invention, there is provided a method for purifying cobalt of sodium and ammonia which involves heating a solution of hexammine cobalt (III) chloride at a temperature of at least about 80° C., adding sodium hydroxide to the solution at a rate of addition not exceeding about 0.22 moles of sodium hydroxide per mole of cobalt per minute with the total amount of sodium hydroxide not exceeding about 1.4 times the stoichiometric amount required to form cobaltic hydroxide, separating the resulting cobaltic hydroxide precipitate from the resulting liquor, washing the precipitate with hot deionized water to remove sodium so that the level of sodium in the cobaltic hyrdoixde is equal to or less than about 60 weight parts per million on a cobalt basis, and firing the resulting washed precipitate at a temperature of from about 180° C. to about 850° C. to remove essentially all of the water and ammonia therefrom.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

This invention relates to a process for removing sodium and ammonia from cobalt by slow precipitation of cobaltic hydroxide from a hexammine cobalt (III) chloride solution to produce a more washable crystal and washing the cobaltic hydroxide to remove sodium, followed by heating the cobaltic hydroxide to remove ammonia.

The hexammine cobalt (III) solution from which cobaltic hydroxide is to be precipitated can be derived from any source. However, it is most typically derived from the processing of cobalt scrap material by digesting the material in hydrochloric acid followed by adding ammonia to produce the cobalt hexammine solution. Details of this process are described in U.S. Pat. No. 4,218,240.

The solution contains typically from about 10 to about 30 g Co/l.

It is important that the solution be at a temperature of at least about 80° C. preferably at from about 90° C. to about 105° C. and most preferably from about 95° C. to about 100° C. These elevated temperatures are important because they promote the formation of large particle size cobaltic hydroxide in the subsequent step of adding sodium hydroxide to the solution. Large particle size material is desired because it is easier to handle, to filter, and its porosity allows the soluble impurities as sodium to be more easily leached out of it.

To the heated hexammine cobalt (III) chloride solution is slowly added sodium hydroxide at a rate of addition not exceeding abut 0.22 moles of sodium hydroxide per mole of cobalt per minute. The preferred rate of addition is about 0.1 moles of sodium hydroxide per mole of cobalt per minute. The total quantity of sodium hydroxide must not exceed about 1.4 and is usually from about 1.2 to about 1.3 times the stoichiometric amount required to form the cobaltic hydroxide to avoid excessive contamination with sodium. The resulting sodium hydroxide-treated cobalt solution is allowed to agitate for a period of time sufficient to allow cobaltic hydroxide to precipitate. The time depends on factors as temperature, etc.

When essentially all of the cobalt has been converted to cobaltic hydroxide, the cobaltic hydroxide is then separated from the resulting mother liquor by any standard technique such as by filtration.

The cobaltic hydroxide precipitate is washed with hot deionized water to remove the sodium so that the level of sodium in the cobaltic hydroxide is equal to or less than about 60 weight parts per million on a cobalt basis. The washing is done usually by allowing the precipitate to remain on the filter by which it was previously separated from the liquor. The wash water is passed over the cake on the filter and simultaneously removed as by vacuum. In this way, the cobaltic hydroxide is immobilized. This immobilization avoids peptizing the cobaltic hydroxide as would happen if the cobaltic hydroxide were slurried in the wash water.

The temperature of the wash water preferably at least about 50° C. to insure that the cobaltic hydroxide is in the large crystal form for the advantages discused previously. Cold water results in a slimy cake which is harder to handle and to wash. Because the cobaltic hydroxide has been precipitated in the crystal form per the precipitation method described above, the sodium is more effectively removed from the cobaltic hydroxide.

The wash cobaltic hydroxide is then fired at a temperature of from about 180° C. to about 850° C. and preferably from about 200° C. to about 300° C. to remove essentially all of the water both free and bound and essentially all of the ammonia therefrom. The firing time depends on factors such as temperature, size of the charge, design of the furnace, etc.

The steps of adding sodium hydroxide slowly to a hot cobalt solution allow for the resulting cobaltic hydroxide to have a large particle size which allows the sodium to be more readily and completely removed from it on water washing. By the method of the present invention, the sodium is reduced to typically <60 weight ppm. The ammonia is reduced from abut 3,000 to about 8,000 ppm to less than about 200 ppm. All ppm values are on a cobalt metal basis.

The resulting dried cobaltic hydroxide can then be dampened with deionized water to minimize dust generation, as cobalt is harmful if inhaled.

To more fully illustrated this invention, the following nonlimiting example is presented. All parts, portions, and percentages are on a weight basis unless otherwise stated. Example A 50% by weight solution of sodium hydroxide is added to an agitated aqueous solution of hexammine cobalt (III) chloride which is at a temperature of at least about 80° C. containing about 20.5 g Co/l, at a rate of about 1.8 ml per minute per liter of cobalt solution (0.09 moles NaOH/mole Co/min.). The total quantity of NaOH which is added is about 1.3 times the stoichiometric quantity required. The total time of addition of the NaOH is about 5 hours. The resulting cobaltic hydroxide precipitate is separated from the resulting liquor by filtration. The precipitate is then washed with about 215 ml of hot deionized water per gram of contained cobalt. The wet cobaltic hydroxide is fired at about 288° C. for about 72 hours. The resulting dried cobaltic hydroxide is wetted to minimize dust. Analysis are as follows: Na—54 ppm (cobalt metal basis) $NH_3$—<215 ppm (cobalt metal basis)

The results show that by the method of this invention, that is the slow addition of sodium hydroxide, at an elevated temperature, the sodium in the resulting cobaltic hydroxide remains low. The results show also that ammonia does not contaminate the cobaltic hydroxide.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for removing sodium and ammonia from cobalt, said method comprising:
   (a) heating a solution of hexammine cobalt (III) chloride at a temperature of at least about 80° C.;
   (b) adding sodium hydroxide to the resulting heated hexammine cobalt (III) chloride solution at a rate of addition not exceeding about 0.22 moles of sodium hydroxide per mole of cobalt per minute with the total amount of sodium hydroxide not exceeding about 1.4 times the stoichiometric amount required to form cobaltic hydroxide and allowing cobaltic hydroxide to precipitate;
   (c) separating the resulting cobaltic hydroxide precipitate from the resulting mother liquor;
   (d) washing said cobaltic hydroxide with hot deionized water to remove sodium so that the level of sodium in said cobaltic hydroxide is equal to or less than about 60 weight parts per million on a cobalt basis; and
   (e) firing the resulting washing cobaltic hydroxide at a temperature of from about 180° C. to about 850° C. to remove any water and ammonia which may be present therefrom.

2. A method of claim 1 wherein said washed precipitate is fired at a temperature of about 200° C. to about 300° C.

* * * * *

UNITED STATES PATENT AND TRADEMARK OFFICE
CERTIFICATE OF CORRECTION

PATENT NO. : 4,840,776
DATED : June 20, 1989
INVENTOR(S) : Eric F. Husted

It is certified that error appears in the above-indentified patent and that said Letters Patent is hereby corrected as shown below:

On the title page, item [75]:

Inventors: Eric F. Husted, Judith A. Ladd, Michael J. Miller, Alan R. Schwartz, and James N. Christini Signed and Sealed this Third Day of January, 1995

Attest:

BRUCE LEHMAN

Attesting Officer

Commissioner of Patents and Trademarks